Figure 1:
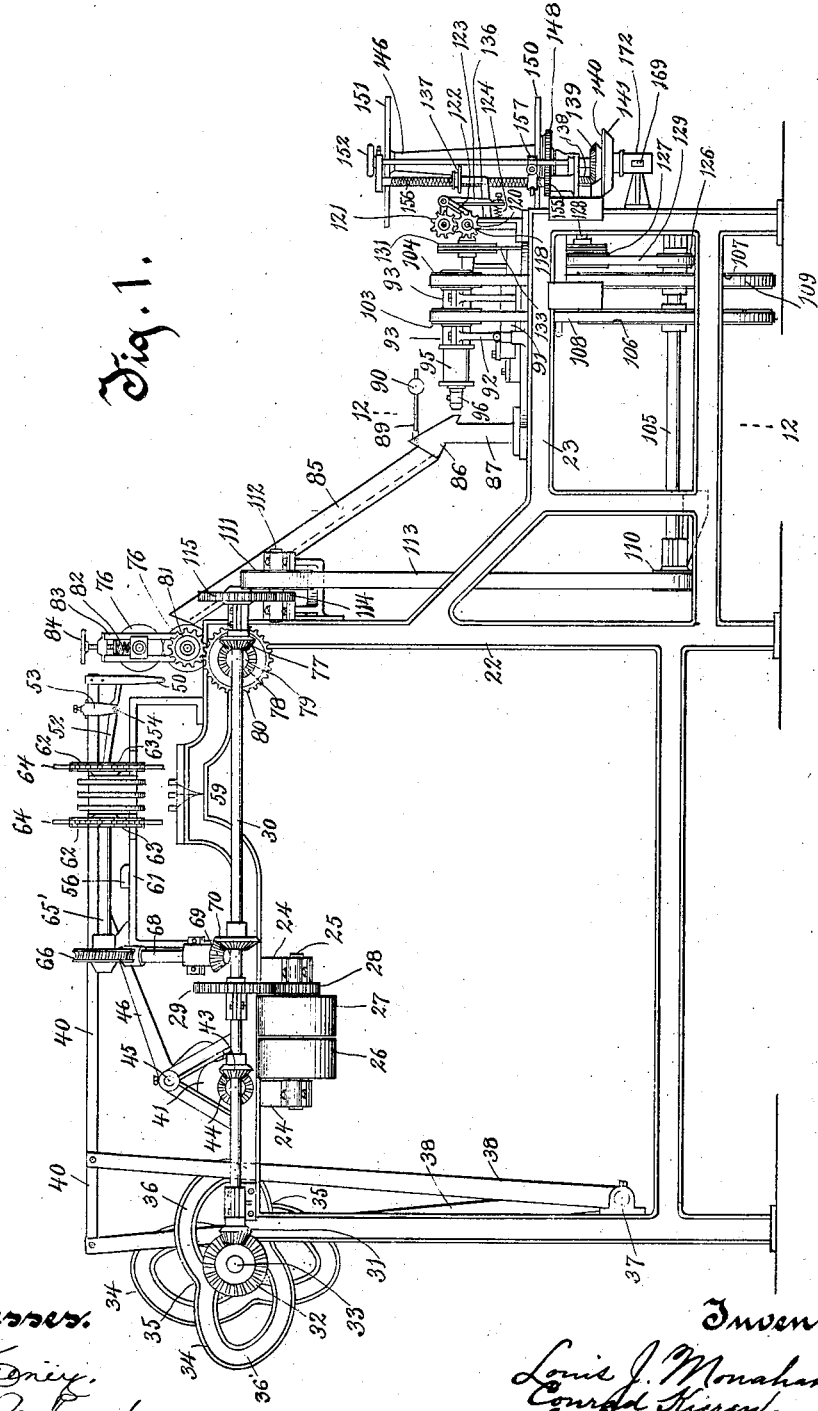

No. 896,655. PATENTED AUG. 18, 1908.
L. J. MONAHAN & C. KIEREN.
MACHINE FOR MAKING TWINE.
APPLICATION FILED DEC. 9, 1901.

7 SHEETS—SHEET 1.

Witnesses.
Inventors.
Louis J. Monahan
Conrad Kieren
By Benedict & Morsell
Attorneys.

No. 896,655. PATENTED AUG. 18, 1908.
L. J. MONAHAN & C. KIEREN.
MACHINE FOR MAKING TWINE.
APPLICATION FILED DEC. 9, 1901.

7 SHEETS—SHEET 2.

Witnesses.
C. H. Keeney.
Anna C. Faust.

Inventors.
Louis J. Monahan.
Conrad Kieren.
By Benedict & Morsell.
Attorneys.

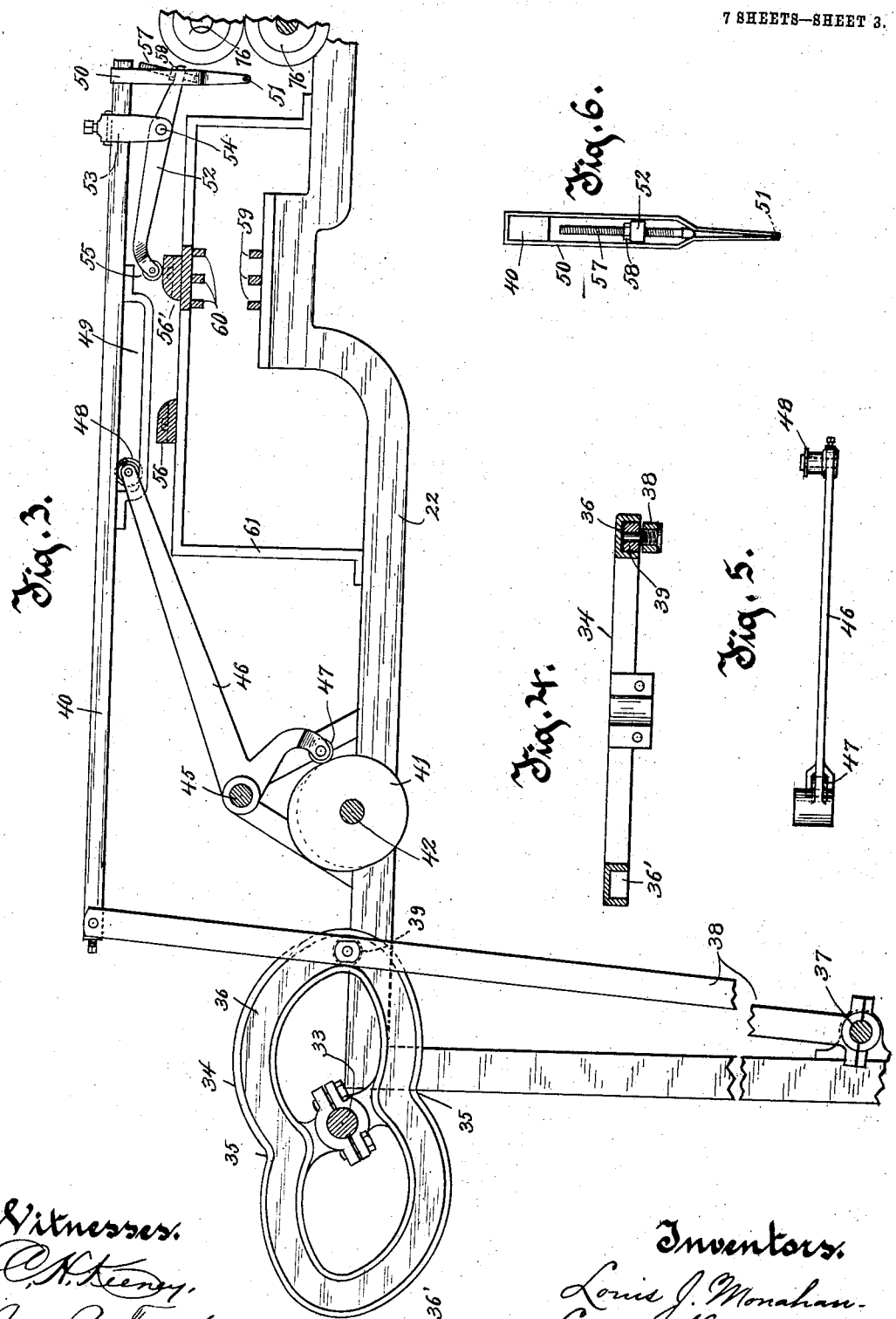

No. 896,655. PATENTED AUG. 18, 1908.
L. J. MONAHAN & C. KIEREN.
MACHINE FOR MAKING TWINE.
APPLICATION FILED DEC. 9, 1901.
7 SHEETS—SHEET 4.
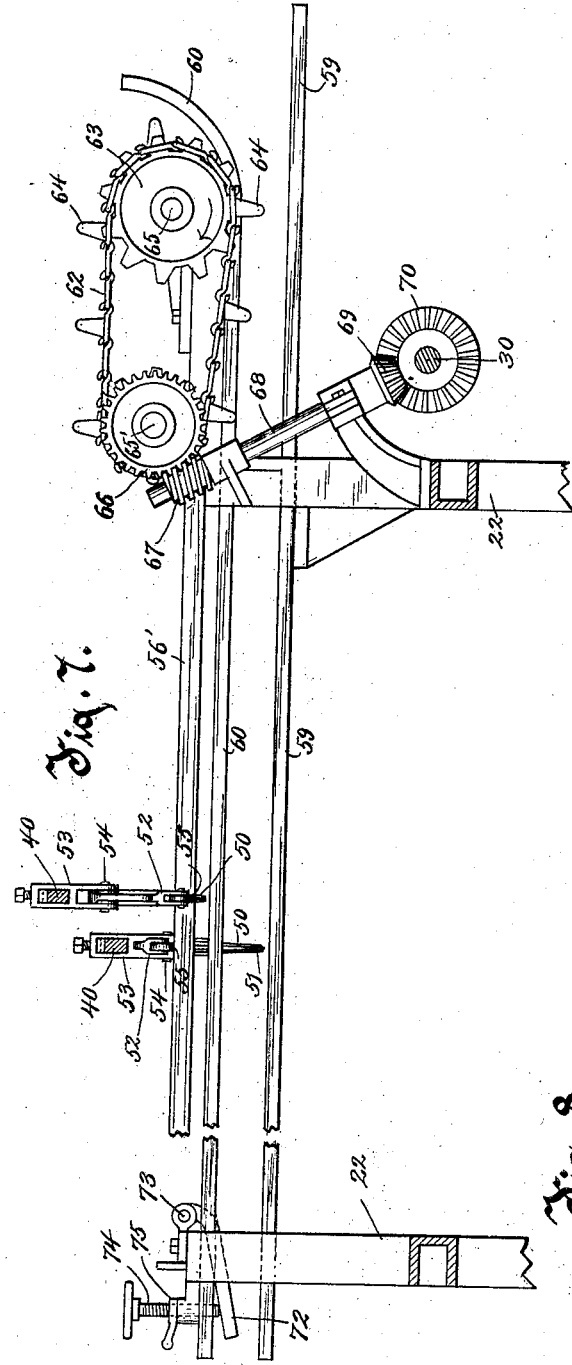
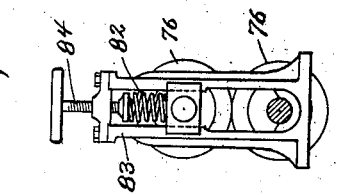
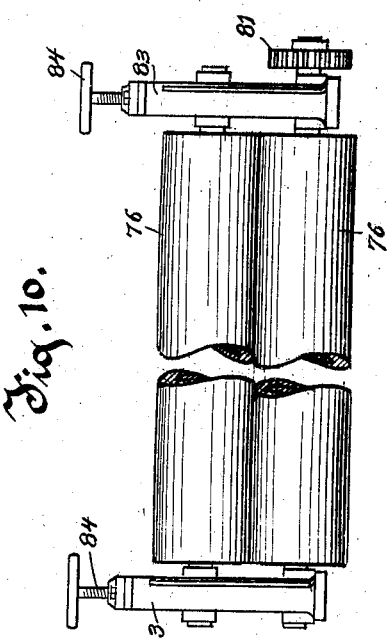
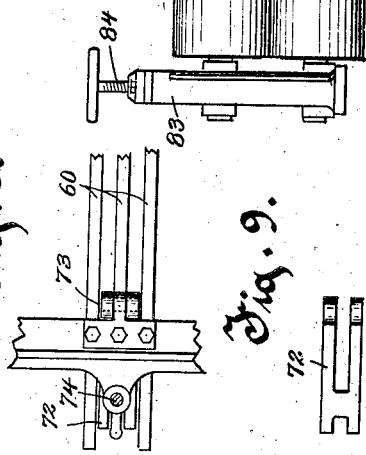
Witnesses.
Inventors.
Louis J. Monahan.
Conrad Kieren.
By Benedict and Morsell.
Attorneys.

No. 896,655. PATENTED AUG. 18, 1908.
L. J. MONAHAN & C. KIEREN.
MACHINE FOR MAKING TWINE.
APPLICATION FILED DEC. 9, 1901.

7 SHEETS—SHEET 5.

Witnesses.
Inventors.
Louis J. Monahan.
Conrad Kieren.
By Benedict & Morsell
Attorneys.

No. 896,655.　　　　　　　　　　　　　PATENTED AUG. 18, 1908.
L. J. MONAHAN & C. KIEREN.
MACHINE FOR MAKING TWINE.
APPLICATION FILED DEC. 9, 1901.

7 SHEETS—SHEET 6.

Witnesses.
Inventors.
Louis J. Monahan
Conrad Kieren
By Benedict & Morsell
Attorneys.

No. 896,655.  
PATENTED AUG. 18, 1908.
L. J. MONAHAN & C. KIEREN.
MACHINE FOR MAKING TWINE.
APPLICATION FILED DEC. 9, 1901.
7 SHEETS—SHEET 7.
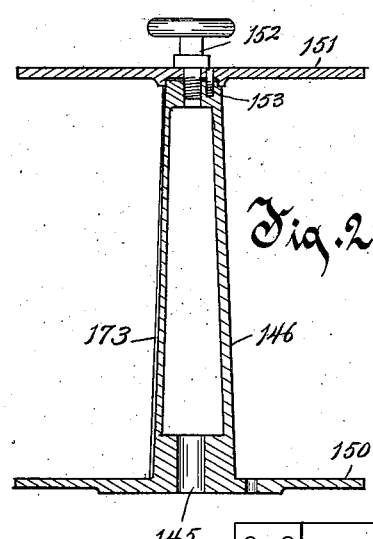
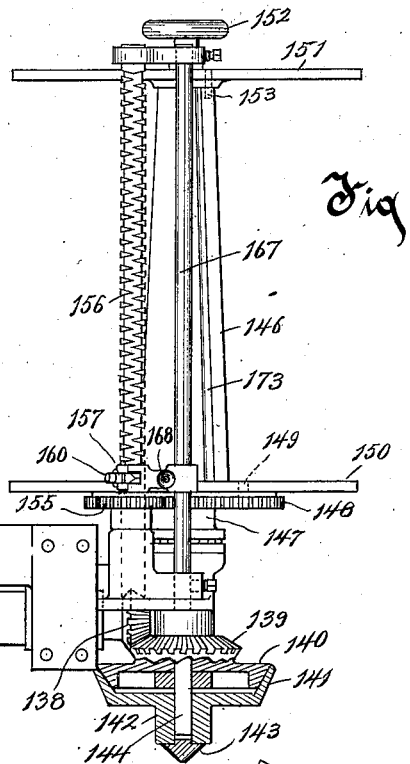
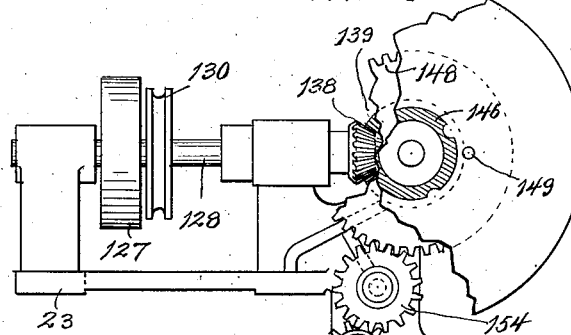
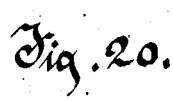
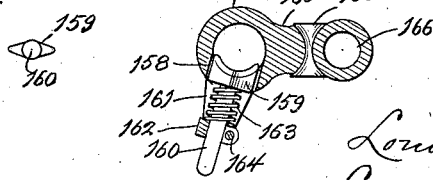

UNITED STATES PATENT OFFICE.

LOUIS J. MONAHAN AND CONRAD KIEREN, OF OSHKOSH, WISCONSIN, ASSIGNORS, BY DIRECT AND MESNE ASSIGNMENTS, TO THE OSHKOSH GRASS MATTING COMPANY, A PARTNERSHIP.

MACHINE FOR MAKING TWINE.

No. 896,655.   Specification of Letters Patent.   Patented Aug. 18, 1908.

Application filed December 9, 1901. Serial No. 85,122.

*To all whom it may concern:*

Be it known that we, LOUIS J. MONAHAN and CONRAD KIEREN, residing at Oshkosh, in the county of Winnebago and State of Wisconsin, have invented a new and useful Improvement in Machines for Making Twine, of which the following is a description, reference being had to the accompanying drawings, which are a part of this specification.

Our invention has relation to improvements in machines for making twine, more particularly, although not necessarily, to twine composed of lengths of grass.

One of the objects of the invention is to provide an improved construction over the form of device covered in Letters Patent of the United States, issued to us on December 10, 1901, No. 688,789, for a machine for making grass twine, whereby the nipper is caused to rise before it completes its forward stroke, and start to fall before it completes its return stroke, and continues to fall a short distance on the forward stroke, thereby avoiding the necessity of the quick movement which was required in the form of construction above referred to, and also providing for a smooth motion, and permitting the machine to be speeded up to the maximum.

Another object comprehended by the present construction is an improved form of mechanism for opening and closing the nippers.

A further object contemplated is the provision of improved means for evenly winding the finished product.

A still further object resides in the improved arrangement, disposition, and combination of parts, whereby advantages are gained in efficiency in operation.

With the above, and other incidental, objects in view, the invention consists of the devices and parts, or their equivalents, as hereinafter more fully pointed out.

Figure 2:
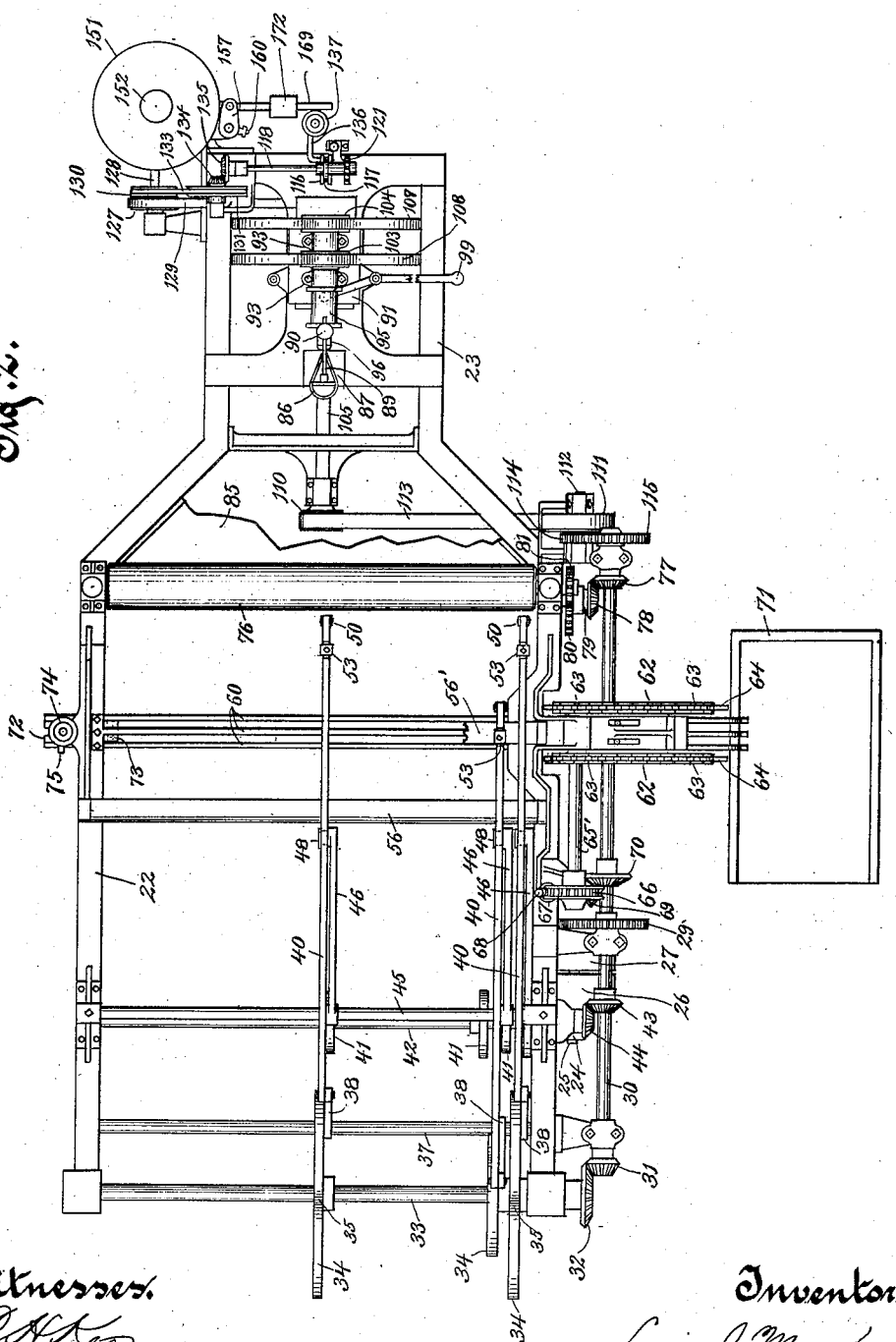
Figure 12:
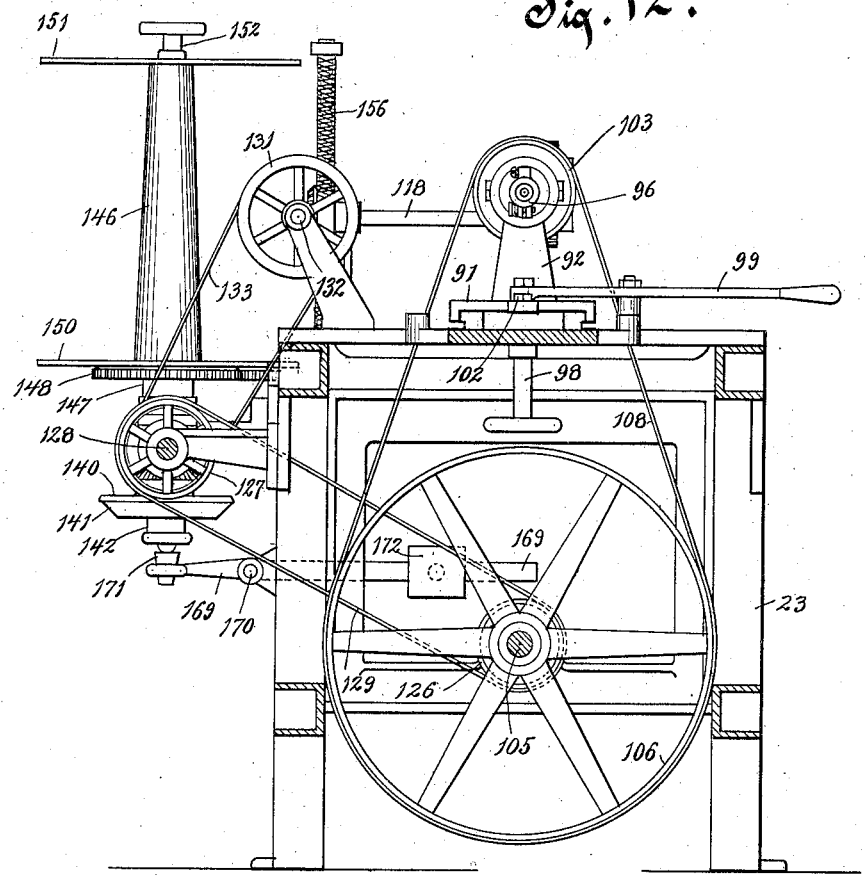
Figure 13:
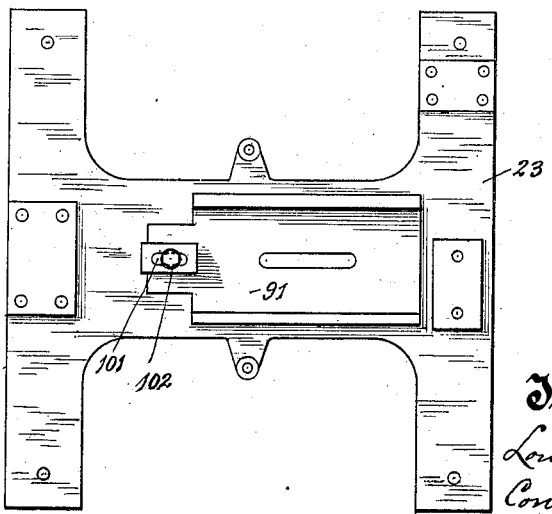
Figure 14:
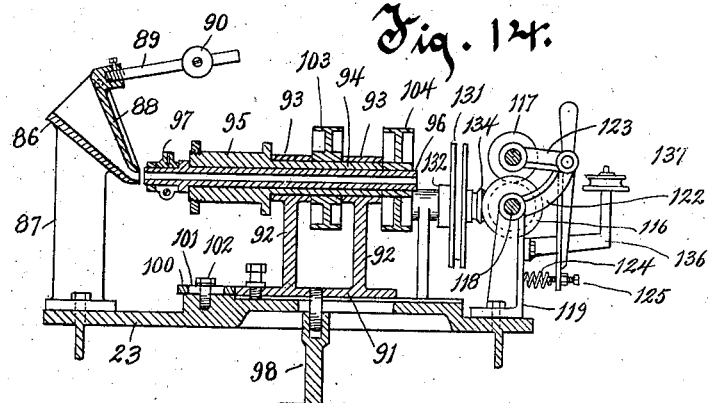
Figure 15:
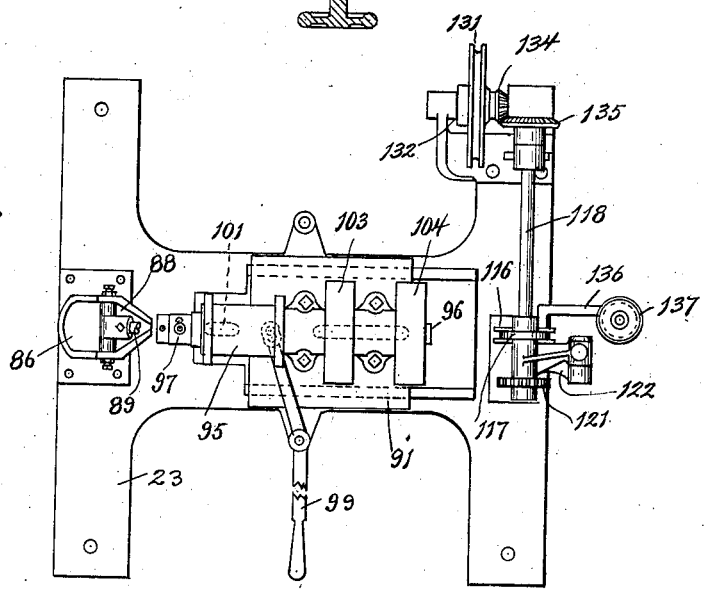
Figure 16:
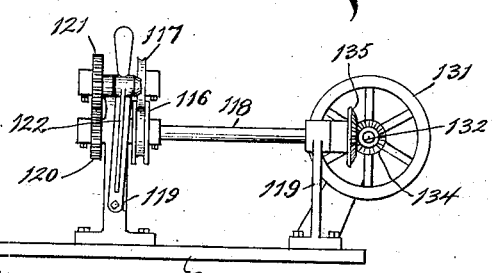

In the accompanying drawings, Figure 1 is a side elevation of the complete machine, with the feed box removed. Fig. 2 is a plan view, with parts broken away, and the feed box in place. Fig. 3 is a detail view showing the mechanism for actuating the nipper carrying rods. Fig. 4 is a section of one of the cams for actuating the nipper carrying rods. Fig. 5 is a detail view of one of the bell crank levers for raising and lowering the nipper-carrying rod. Fig. 6 is a detail view of one of the nippers. Fig. 7 is a fragmentary elevation showing the mechanism for feeding the material across the path of the travel of the nippers, two of said nippers being shown in place. Fig. 8 is a plan view of a fragment of the frame showing the adjustable gate. Fig. 9 is a plan view of the gate. Fig. 10 is a view of the pulling rolls. Fig. 11 is an end view of Fig. 10. Fig. 12 is a section on the line 12—12 of Fig. 1, looking to the right. Fig. 13 is a plan view of the bed of the frame work shown in Fig. 12. Fig. 14 is a central, longitudinal, sectional view through the twine wrapping mechanism. Fig. 15 is a plan view of the mechanism shown in Fig. 14. Fig. 16 is a rear elevation of Fig. 14. Fig. 17 is a detail view of the winding drum, and mechanism for operating the same. Fig. 18 is a plan view of Fig. 17, parts broken away. Fig. 19 is a detail sectional view of the traveling nut. Fig. 20 is an end view of the device which travels in the right and left hand screw, and Fig. 21 is a longitudinal sectional view of the winding drum.

Referring to the drawings, the numeral 22 indicates the main portion of the frame of the machine, and 23 a rear extension therefrom. This frame work may be of any desirable construction best adapted for supporting the operative parts, although the form shown in the accompanying illustration has been found in practice to be well suited for the purpose.

Depending from the under side of one of the top beams of the frame are bearings 24, 24 in which is mounted a short shaft 25, having fast and loose pulleys 26 and 27 respectively thereon. A belt (not shown) and extending from the driving power is passed around either one or the other of these pulleys. The shaft 25 has also mounted thereon a pinion 28, which engages a toothed wheel 29 mounted upon a longitudinal shaft 30. The forward end of shaft 30 carries a beveled pinion 31 which meshes with a beveled gear 32 on one end of a transverse shaft 33. Mounted upon this transverse shaft are a series of double cams 34. Any desired number of these cams may be employed, although in practice we usually employ eighteen. In Fig. 2 of the drawings, however, we have only shown three of these cams and related parts, as these are sufficient to fully illustrate our invention. The cams 34 are of the shape clearly shown in the accompanying drawings, each being provided on one side, adjacent to its irregular periphery, with a groove, which groove at the points 35, 35 is carried inwardly, thereby dividing the entire groove into two divisions, one indicated by the numeral 36, and the other by the numeral 36'.

Mounted upon a lower transverse shaft 37 are a series of upwardly extending rocking arms 38. Each arm carries on one side thereof a roller 39, said roller adapted to travel in the groove of its respective cam 34. Pivoted to the upper end of each rocking arm is a nipper-carrying rod 40.

It is obvious from the construction thus far described that when the shaft 33 is rotated, by reason of the engagement of the rollers 39 with the grooves of the cams 34, and by reason of the varying angles of the cams on the shaft, positive alternate back and forth movements will be imparted to the nipper-carrying rods, a slow forward movement being imparted thereto, and a quick return movement.

For the purpose of raising and lowering the nipper-carrying rods, we employ improved mechanism, whereby the raising of the nipper can be started before said nipper completes its forward stroke, and the lowering of the nipper started before said nipper completes its return stroke, the lowering continuing for a short distance of its forward stroke, and thereby providing a smooth motion, and permitting the machine to be speeded up considerably. This mechanism consists in providing a series of small cams 41 corresponding in number to the number of cams 34 employed. These cams 41 are mounted on a transverse shaft 42, which shaft may conveniently derive its rotation from the shaft 30, said shaft 30 having a beveled gear wheel 43 mounted thereon which meshes with a similar beveled gear wheel 44 on the shaft 42. Above the shaft 42 is another transverse shaft 45 on which is mounted a series of bell-crank levers 46, there being one of said bell-crank levers provided for each cam 41. The curved end of the short arm of each of these bell-crank levers carries an anti-friction roller 47 which rides around the periphery of the cam relating thereto. The end of the long arm of each bell-crank lever also carries an anti-friction roller 48, which travels in a guide-way 49 provided on the under side of the nipper-carrying rod, said guide-way being preferably formed by a U-shaped strap secured to the under side of each nipper-carrying rod. The cams 41 are so constructed that as the nipper-carrying rods are reciprocated said rods are raised and lowered by reason of the anti-friction roller 47 of each bell-crank lever riding around the periphery of a cam 41, and by reason of the roller 48 at the end of the long arm of the bell-crank lever engaging the guide-way 49 of each nipper-carrying rod. The raising of a nipper-carrying rod is thereby effected before said rod completes its forward stroke, and the lowering is effected before a nipper-carrying rod completes its return stroke, the lowering continuing for a short distance on the forward stroke.

The nipper devices, indicated by the numeral 50, are secured to and depend from the nipper-carrying rods at or near the free ends of said rods. Each nipper is formed with two spring-side members, which from a desired point above the lower end thereof are gradually converged to the lower extremities, at which points the ends of the nippers meet. One of the gripping jaws of each nipper device is provided with a laterally extending lug 51, shown by dotted lines in Fig. 6, the end of said lug adapted to fit in an opening or recess in the other jaw. This lug is so spaced from the ends of the jaws as to provide a space only sufficient to admit one or two lengths of the material to pass between the jaws at a time.

While it may be possible for the jaws to be opened merely by the engagement thereof with the material fed transversely through the machine, yet we prefer to provide mechanism for positively effecting such opening. This consists of a lever 52 which is pivoted between its ends to a part 53 depending from the nipper-carrying rod. This part is advisably adjustable on the rod, and to effect this the said part is provided with an opening through which the rod passes (see Fig. 7), and a set screw passes through the top of the part, and the lower end of said set screw is caused to impinge against a key disposed on the upper edge of the rod. The lever is pivoted between the bifurcated lower portion of the part 53 on a pivot pin 54. The forward end of the lever 52 carries an anti-friction roller 55 which is adapted to ride over trip bars 56, 56'. The rear end of each lever 52 carries an arm 57, the lower end of which (preferably enlarged to form a head) is adapted to be in line with the space between the upper portions of the gripping jaws of the nippers, at the point where said jaws begin to converge downwardly. It may be desirable to provide for adjusting the arm 57, and for this reason we prefer to make said arm screw-threaded, and pass it through a threaded opening at the rear end of the lever 52, and turning a jam-nut 58 thereon and against the lever, in order to hold the screw arm in adjusted position. The trip bars 56, 56' are disposed the proper distance apart so as to cause the gripping jaws to open and close at the proper time. For instance, when a roller 55 rides up on to the top surface of one of said trip bars, the lever 52 will be turned on its pivot so as to thrust the rear end, or the short arm, of said lever downwardly, and cause the arm 57 carried thereby to be thrust in between the jaws of the nipper and thereby open said jaws in order to allow a length or lengths of the material fed through the machine to pass between said jaws. In the reciprocation of the nipper-carrying rod, when the roller 55 rides off the trip bar, the lever 52 is turned in a direction to raise the arm 57, and thereby permit the jaws of the nipper to close on the length or lengths of the material therebetween. The operation of opening and closing the jaws takes place at the beginning of the nipper travel, and the same operation is again performed at the end of the nipper stroke, in order to release the length or lengths of the material. The trip bar 56 performs this function at the beginning of the nipper travel, and the bar 56' at the end of said nipper travel. It will be understood, of course, that a lever 52 and related parts is provided for each nipper carrying rod.

Extending across from one top bar to the other of the main portion 22 of the frame are a series of slats 59 set edgewise, and above these slats 59 are similar slats 60 secured to an auxiliary frame work 61. These slats extend laterally beyond one side of the frame of the machine. The space between the opposed edges of these slats is the space in which the lengths of the material are fed into and transversely across the machine and constitutes a feedway, the said lengths, however, being arranged longitudinally of the machine. Suitable mechanism is required for forcing said lengths of the material across the slats, and for this purpose we provide a carrier preferably consisting of two chains 62, 62, said chains passing around sprocket wheels 63, and provided with projecting fingers 64 which engage and force the material to the space between the slats, as the carrier is caused to travel. The wheels 63 are mounted on shafts 65, 65'. The shaft 65' may be driven in any desirable manner, but we prefer to accomplish this by mounting on one end thereof a worm wheel 66, said worm wheel being engaged by a worm 67 on the upper end of an inclined shaft 68. The opposite end of this inclined shaft is provided with a beveled pinion 69 meshing with a bevel gear 70 mounted on the shaft 30. It is obvious that when the shaft 30 is rotated, rotation is imparted to the chains 62 of the carrier through the described gearing.

As stated, and as will be noticed from Fig. 7 the slats 59 and 60 are continued out laterally from one side of the frame of the machine, and beneath the chains 62, the upper slats being preferably curved upwardly to form a wide and flaring mouth for the entrance of the material to the passage way between the slats. At the outer extremities of these extended ends of the slats is arranged a feed box 71 (see Fig. 2). When the machine is in operation the grass, or other material to be operated upon, is arranged in the feed box with their lengths in the direction of the length of the machine. The material passes from said box into the feedway formed between the slats, where it is acted upon by the fingers 64 of the carrier and forced transversely across the machine, the portion of the material acted upon by the fingers continually crowding material in advance thereof through the feedway. During the travel of material through this feedway, and after said material reaches the main passage of the machine the gripping jaws of the nippers act upon said material and carry the same to the succeeding portion of the mechanism hereinafter to be explained. In order to retard as much as possible the passage of the material through the feedway so as to afford the gripping jaws ample opportunity to act on said material, we provide at the end of the feedway opposite to the feed end a retarding device consisting of an adjustable gate 72 hinged at the point 73 to one of the beams of the frame work. In Fig. 7 of the drawings, we show the free end of this gate raised as if the material were pressing against the under side thereof, as is the case in actual practice, when the machine is in operation. The extent to which this free end of the gate may be uplifted is adjustably regulated by means of a screw 74 which engages a threaded opening in the frame. The lower end of this screw is adapted to be contacted with by the gate. By turning this screw, it is obvious that the extent of the uplifting of the gate may be readily regulated. For convenience in turning, the upper end of the screw is provided with a hand wheel. We also provide on the screw a jam nut 75 which is turned down against the gate, in order to hold the screw in adjusted position.

In advance of the nippers are arranged rolls 76, 76, said rolls being covered with some yielding material, preferably rubber, and the yielding coverings being in contact with each other. Rotation may be positively imparted to one of said rolls, and the positive rotation of this roll imparted to the other roll by reason of the frictional contact between the two rolls, or by a pair of gears connecting them. The positive rotation of one of said rolls may be accomplished by a system of gearing between the axis of said roll and the shaft 30. This gearing, specifically, consists of a beveled pinion 77 mounted on the shaft 30 which meshes with a beveled gear wheel 78 on a short shaft 79. Short shaft 79 also carries a toothed wheel 80 which toothed wheel meshes with a pinion 81 on the axis of the lower roll 76.

The rolls 76, 76 are held in yielding contact with each other by means of coiled springs 82 bearing against the bearing boxes of the axis of the upper roll 76. These bearing boxes work in slotted standards 83, and the tension of the springs is regulated by means of screws 84 turning through the tops of the slotted standards.

Leading from the rolls 76, 76 is a downwardly inclined chute 85, which is advisably of a substantial V shape in cross section. The lower end of this chute communicates with a funnel 86 formed at the upper end of a standard 87. This funnel is gradually converged to its discharge end, and the material passing therethrough is necessarily compressed and forced together as it seeks its outlet through the discharge opening of the funnel. This compression is automatically regulated to suit the amount of material passing through the funnel by forming the upper portion of the funnel into a lid 88 (see Fig. 14). This lid is pivoted at its upper end, so that its lower or rear end which forms the upper side of the discharge opening is free. To provide for the extent of resistance which this free end of the lid offers to the material passing through the discharge orifice of the funnel, we employ an arm 89 extending from the lid at a point substantially in line with the pivot of said lid. On this arm is mounted an adjustable weight 90. It is obvious that by changing the position of the weight on the arm the degree of resistance offered by the free end of the lid may be regulated.

In line with the discharge opening of the funnel is the twine wrapping mechanism. Referring to this mechanism, the numeral 91 indicates a base piece from which extends upwardly the standards 92, 92, said standards formed at their upper ends with bearings 93, 93. In these bearings is journaled a tubular shaft 94, said shaft being formed or provided at one end with a spool 95 upon which the wrapping thread (not shown) is wound. The outer head of this spool has a threaded engagement with the spool, as clearly shown in Fig. 14, so as to provide for the removal of said head. When the head is removed the twine can be readily slipped on to the spool and the removable head then readjusted to place. Extending longitudinally through the bore of the tubular shaft 94 is the tension carrying shaft 96, the ends of said shaft projecting beyond the ends of shaft 94. The inner end of shaft 96 carries the tension 97 which tension is advisably in the form of a split collar, of the same character as that covered in our issued Patent No. 688,789, dated December 10, 1901. The tension 97 is also designed to have extending therefrom a spring-arm (not shown) similar to the spring arm shown in said issued patent, and provided at its free end with a hook which the thread from the spool is adapted to engage, the said thread being extended from the hook to the proper position for being wrapped around the compressed lengths of the material.

In order to place a new supply of thread upon the spool 95, we provide an adjustment of the standards 92. The base plate of these standards is normally held by means of a clamping arm 98 which engages the threaded end of a pin extending from the plate 91, and through an elongated slot in one of the upper beams of the rearward extension 23 of the frame. In order to adjust the standards farther away from the discharge opening of the funnel, so as to provide room for inserting a new supply of twine on to the spool, a pivoted lever 99 is manipulated. This manipulation, after the arm 98 has been loosened, will cause the base piece 91, and the parts carried thereby, to be slid along in a direction away from the discharge opening of the funnel. The new supply of twine can then be readily placed upon the spool by turning off the removable head of the spool. After this head is readjusted to place the lever 99 is turned in the opposite direction in order to bring the parts back to their former position, and after this the arm 98 is again tightened.

Where it is desired to make stronger twine for different purposes the thread must be applied closer to the discharge orifice of the funnel. To provide for this a plate 100 is seated on one of the top beams of the rearward extension 23 of the main frame, said plate being provided with an elongated slot 101 through which a set screw 102 is passed and turned into said beam of the rearward extension of the frame work. Whenever this set screw is loosened, the plate 100 can be moved toward the funnel, and the base piece 91 is then free to be moved in the same direction (after first turning out the arm 98), and when the desired position is reached the arm 98 and the set-screw 102 are again tightened.

The spool-carrying shaft 94 and the tension-carrying shaft 96 are intended to be driven in the same direction, but in order to obviate the necessity of the tension slipping, as has heretofore been found necessary in order to wind the thread on the twine, we prefer to drive the tension-carrying shaft 96 at a slower rate of speed than the thread-carrying shaft. In other words, if the tension-carrying shaft and the spool-carrying shaft are run in the same direction and at the same rate of speed, it is absolutely necessary that provision should be made for the tension slipping, as otherwise the thread would not wind around the lengths of the material. It is desirable to do away with the necessity for providing for the slipping of the tension, and we have therefore obviated this difficulty by running the tension-carrying shaft at a slower rate of speed than the spool-carrying shaft, and by reason of a fine adjustment of the speeds there will be no slippage required. Of course by this arrangement a continual lessening in the tension on the thread would occur were it not for the fact that the slack so produced is taken up by the winding of the thread around the lengths of the material. The means for rotating the spool-carrying shaft and the tension-carrying shaft in the same direction will now be explained. Mounted on the spool-carrying shaft between the bearings 93 is a pulley 103, and mounted on the outer end of the tension-carrying shaft is a similar pulley 104. Below the spool-carrying shaft and the tension-carrying shaft is another shaft 105, and mounted on this shaft are two belt pulleys 106 and 107 respectively. Pulley 106 is connected to pulley 103 of the spool-carrying shaft by means of an endless belt 108, and pulley 104 on the tension-carrying shaft is connected to the pulley 107 by means of an endless belt 109. Shaft 105 may be rotated in any desirable manner. We prefer, however, to rotate the same by a system of gearing and belting between it and the shaft 30. This consists in mounting on the inner end of the shaft 105 a belt pulley 110, and this pulley is connected to an upper pulley 111 mounted on a short shaft 112 by means of an endless belt 113. The short shaft 112 has mounted thereon a pinion 114, which pinion is engaged by a toothed wheel 115 on the end of the shaft 30.

After the twine leaves the wrapping mechanism, it is carried between two draw rolls. The lower of these draw rolls, indicated by the numeral 116, is provided with a grooved periphery, and the upper of said rolls, indicated by the numeral 117, has its periphery also slightly grooved, and fitting in the groove of the periphery of roll 116. The axis or shaft 118 of the roll 116 is mounted in upwardly extending standards or bearings 119, 119. On one end of this shaft is a toothed wheel 120 which meshes with a similar toothed wheel 121 on the short shaft or axis of the upper roll 117. It is evident that when the shaft 118 is rotated and the lower roll 116 thereby rotated therewith, rotation will be imparted to the upper roll through the intermeshing wheels 120 and 121. It is advisable to hold the upper roll yieldingly against the lower roll, and to provide means for regulating its downwardly yielding pressure. To effect this, we show as extending from one of the standards 119 an arm 122, and to this arm is pivoted a bell-crank lever 123. The upper arm of this bell-crank lever forms the bearing for the axis of the upper draw roll 117, as most clearly shown in Figs. 14 and 15. A coiled spring 124 presses outwardly against the lower arm of the bell-crank lever, near the lower end of said arm, said spring being interposed between one of the standards 119, and the inner side of the lower arm of the bell-crank lever, and a set-screw 125 engages the outer end of said spring, so that, when the screw is turned the tension of the spring may be either increased or decreased, in accordance with the direction of the turning of the screw. From the fact that the spring 124 presses outwardly, it is evident that the upper roll is forced yieldingly downward into the groove of the lower roll. This permits the wrapped twine to readily pass between the rolls, notwithstanding any irregularities in the size or diameter of the twine, as the yielding capability of the upper roll will permit said roll to readily adjust itself to such irregularities. The shaft 118, may be rotated in any desirable manner, but we prefer to rotate the same by suitable connections from the shaft 105. We therefore provide on said shaft 105 a small pulley 126, and this pulley is connected up to another pulley 127 on a short shaft 128 by means of an endless belt 129. On the shaft 128 is mounted a grooved pulley 130, and this grooved pulley is connected up to another grooved pulley 131 on an upper short shaft 132 by means of an endless belt 133. On the outer end of short shaft 132 is a beveled pinion 134, and this beveled pinion meshes with a beveled gear 135 on the shaft 118. From this connection it will be readily seen that the rotation of the shaft 105 is transferred to the shaft 118.

Extending outwardly from one of the standards 119 is an angular arm 136, and mounted revolubly on the upper end of this arm is a horizontal grooved guide roller 137. The wrapped twine when engaged by the draw rolls 116 and 117 is pulled through the bore of the tension-carrying shaft 96, and then engages the groove of the guide roll 137, and is guided by said roll to the winding mechanism now about to be explained.

Any desirable form of mechanism for winding the finished product may be provided, but we prefer to employ the improved mechanism illustrated in the accompanying drawings. Referring to this mechanism the numeral 138 indicates a beveled pinion on the end of the shaft 128. This pinion meshes with a beveled gear 139, and said gear 139 is formed on its under side with a friction wheel 140 having a beveled periphery. This friction wheel fits within, and its beveled periphery engages, the correspondingly beveled inner side of the periphery of another friction wheel 141. Friction wheel 141 is provided with a depending stem 142, said stem having a conical tip 143. The friction wheel 141 is fast on an upwardly extending shaft 144, and this shaft enters and is fast in an opening 145 in one end of the winding drum 146. Fast to the shaft 144 is the hub 147 of a gear wheel 148. This gear wheel has extending from its upper face a pin 149, which pin engages an opening in one of the end flanges or heads 150 of the drum. The rotation of the shaft 144 will therefore cause the rotation of the drum 146. The opposite end or head 151 of the drum is removably secured to the drum, preferably by turning a screw 152 through said end or head and into the end of the drum. This screw is preferably provided on its outer end with a hand wheel for convenience in turning the same. Another and smaller screw 153 may also engage said head and end of the drum, in order to more securely connect the parts. The gear wheel 148 intermeshes with an intermediate gear wheel 154, and this intermediate gear wheel in turn meshes with a pinion 155, said pinion being on the end of a doubly and reversely screw-threaded shaft or worm 156 which is parallel with the drum. It will be seen from the described gearing that when the shaft 144 is rotated not only is the drum rotated but also the doubly and reversely screw-threaded shaft 156. Two reversely disposed spiral channels are cut in the shaft 156, thereby forming a double screw or worm. These spiral grooves cross each other regularly on the shaft. On this screw-threaded shaft is a non-revoluble traveling guide 157, consisting of a band or ring fitted and loose on the shaft. From the main opening of this guide extends a branch opening 158, and in this opening 158 is fitted a spring-actuated dog 159, said dog having its inner edge rounded so as to accurately fit the screw shaft and engage the threads thereof. This dog is provided with an outwardly extending stem 160, and the guide is provided with a projecting lug 161, having a projection 162 at its outer end, and through which projection the stem is adapted to pass. Interposed between the projection 162 and the outer side of the dog is a coiled spring 163. A pin 164 intersects the slot of the projection 162, as most clearly shown in Fig. 19. Upon the removal of this pin, it is evident that the dog may be readily removed from the guide. The guide is also provided with a projecting boss 165, which at its end is provided with an opening 166 through which a guide rod 167 passes, the opening being large enough to admit of the boss being freely movable on the rod. The boss is also intersected by an opening 168 through which the end of the finished product passes, the ends of said opening being preferably flared so as to permit the twine to readily enter the opening. The fact that the boss travels along the guide rod 167 prevents the guide from rotating on or with the worm. In the operation of this winding mechanism, as the worm or screw is rotated, the guide by reason of the fact of its being prevented from rotating, will be caused to travel longitudinally of the worm along it first in one direction and then in the other, and that thereby the twine running through the boss of the guide will be regularly wound back and forth on the drum in succeeding layers, thus obviating any bunching of the line together at any point on the drum. In view of the fact that as the twine is wound upon the drum, the diameter of said drum is increased, it is necessary that there should be slippage of the drum, in order to compensate for this gradually increasing diameter, it being understood that the twine is always supplied in a regular and even quantity or amount. This is provided for by the friction wheels 140 and 141, which while held in frictional contact will not slip when the necessity above noted arises. When the necessity does arise, or when the diameter of the drum is increased, it is necessary that said drum take up the same amount of twine (the said twine as before stated being always fed to the drum in a regular and even quantity) notwithstanding the fact that the diameter of said drum is increased and that it makes the same number of revolutions as when its diameter was considerably less. This is provided for by the friction wheels which, under the circumstances mentioned, slip and thereby provide for the contingency mentioned. In order to automatically regulate the extent of the frictional contact of the two friction wheels with each other, we provide a lever 169 pivoted intermediate of its ends at the point 170, and having its outer end provided with a contact piece 171 which engages or contacts with the conical tip 143 of the depending stem 142 of the friction wheel 141. On the long arm of the lever is adjustably mounted a weight 172. By changing the position of this weight on the arm, the extent of the pressure of the contact piece 171 of the lever against the conical tip 143 of the depending stem of the friction wheel 141 may be conveniently regulated.

In the operation of our improved machine, rotation of course is first imparted to the shaft 25 in order to give motion to the several rotatable parts. The lengths of material (which, in the case grass twine is being made, consists of lengths of grass) are placed in the feed box 71, and pass down into the feedway between the slats 59 and 60, where they are acted upon by the fingers 64 of the carrier, and thence forced by said fingers across the machine in the feedway between the slats 59 and 60, as hereinbefore fully pointed out. By the operation of the nippers, a length or lengths of the material so forced across the machine is or are grasped by the jaws of each nipper, and thereby carried through the longitudinal passage of the machine towards the rollers 76, the ends of said lengths of material passing between the rollers and being pulled entirely therebetween. The said lengths next pass into the chute 85 where they are brought together by the V-shaped formation of the chute. The lengths slide down this chute and into the funnel 86, which funnel further brings the lengths closer together. From the funnel the lengths in their compressed but untwisted condition pass into and through the bore of the tension-carrying shaft 96, and by reason of the rotation of the spool-carrying shaft 94, the twine is wrapped firmly around the material, the said material being pulled out by the draw rolls 116 and 117, and after which it is wound upon the drum 146. It will be understood that at the first starting of the machine the thread or twine from the spool 95 is wound slightly by hand around the compressed lengths of material, and the rotation of the thread-carrying shaft continues the winding throughout the further operation of the machine, the winding of the thread around the compressed lengths of the material holding said lengths together. It will also be understood that at the starting of the machine, as soon as the compressed and wound twine passes from between the draw rolls 116 and 117, its end is passed through the opening 168 of the guide, and around the drum 146.

While we have herein shown and described mechanism for compressing the lengths of the material together so as to form a compressed product, in contradistinction to a twisted product, yet it will be understood that our mechanism for carrying the lengths of material from its passageway or holder can be employed in connection with mechanism for twisting the lengths of the material, the said twisting mechanism being substituted for the chute 85 and the funnel 86.

While we have herein shown and described certain details of construction, yet we do not wish to be understood, in all cases, as specifically limiting ourselves thereto, inasmuch as variations and modifications may be resorted to without departing from the spirit and scope of our invention.

It will be noticed that the winding drum is provided with a series of longitudinal grooves 173, preferably three of said grooves being provided. These grooves permit of the passing therein of a piece of twine inside of the filled spool (after said spool is filled with twine) said piece of twine then being carried around the ends of the wound twine and tied together. By this provision, when the ball of twine is slipped off the spool or drum it will not fall apart or unwind.

What we claim as our invention is;

1. In a machine for making twine, the combination of a feedway or holder for the material, a series of devices each provided with a nipper, levers pivoted to the ends of the nipper devices, and each provided with a projection, and rotatable double cams set at varying angles, each cam provided therearound with a groove engaged by the projection of a lever, said groove being carried inwardly at two points to divide the groove into two divisions, the engagement of said grooved cams with the levers causing alternate back and forth movements of the nipper devices, the nipper of each nipper device on the forward stroke extending into the material and moving a portion thereof.

2. In a machine for making twine, the combination of a feedway or holder for the material, a series of devices, each provided with a nipper, levers pivoted to the ends of the nipper devices, and each provided with an anti-friction roller, and rotatable double cams set at varying angles, each cam provided therearound with a groove engaged by the roller of a lever, said groove being carried inwardly at two points to divide the groove into two divisions, the engagement of said grooved cams with the levers causing alternate back and forth movements of the nipper devices, the nipper of each nipper device on the forward stroke extending into the material and moving a portion thereof.

3. In a machine for making twine, the combination of a feedway or holder for the material, a series of devices each provided with an elongated guideway, and also provided with a nipper, means acting on the nipper devices to cause alternate back and forth movements thereof, a series of cams, and a series of pivoted bell-crank levers, the short arms thereof engaging the cams, and the long arms thereof engaging the elongated guide ways of the nipper devices.

4. In a machine for making twine, the combination of a feedway or holder for the material, a series of devices, each provided with an elongated guideway, and also provided with a nipper, means acting on the nipper devices to cause alternate back and forth movements thereof, a series of cams, and a series of pivoted bell-crank levers, the short arms thereof provided with anti-friction rollers acting against the cams, and the long arms thereof provided with anti-friction rollers engaging the elongated guide ways of the nipper devices.

5. In a machine for making twine, the combination of a driven shaft, another shaft, a series of cams mounted on the latter shaft, means for transferring the rotation of the driven shaft to said latter shaft, a feedway or holder for the material, a series of devices, each provided with an elongated guideway, and also provided with a nipper, means acting on the nipper devices to cause alternate back and forth movements thereof, and a series of pivoted bell-crank levers, the short arms thereof engaging the cams, and the long arms thereof engaging the elongated guide ways of the nipper devices.

6. In a machine for making twine, the combination of a feedway or holder for the material, a series of devices, each provided with a nipper, each nipper consisting of depending spring arms converged from a desired point above their lower ends to said lower ends, in order to form gripping jaws, means acting on the nipper devices to cause alternate back and forth movements thereof, and a lever pivoted to each nipper device, the rear end of said lever carrying an arm located between the spring arms of a nipper, and adapted, when the lever is turned in one direction, to open the jaws, and when turned in the opposite direction, to close said jaws, the opening and closing occurring at the beginning of the nipper travel, in order to adapt the jaws to grasp a length or lengths of the material, and also occurring at the end of the nipper travel in order to permit the jaws to release the length or lengths of material.

7. In a machine for making twine, the combination of a feedway or holder for the material, a series of devices each provided with a nipper, each nipper consisting of depending spring arms converged from a desired point above their lower ends to said lower ends, in order to form gripping jaws, means acting on the nipper devices for causing alternate back and forth movements thereof, and a lever pivoted to each nipper device, the rear end of each lever carrying an adjustable arm located between the spring arms of a nipper, and adapted when the lever is turned in one direction, to open the jaws, and when turned in the opposite direction, to close said jaws, the opening and closing occurring at the beginning of the nipper travel, in order to adapt the jaws to grasp a length or lengths of the material, and also occurring at the end of the nipper travel in order to permit the jaws to release the length or lengths of the material.

8. In a machine for making grass twine, the combination of a feedway or holder for the material, a series of devices, each provided with a nipper, each nipper consisting of depending spring arms converged from a desired point above their lower ends to said lower ends, in order to form gripping jaws, means acting on the nipper devices for causing alternate back and forth movements thereof, a part adjustable on each nipper device, and a lever pivoted to said adjustable part, the rear end of each lever carrying an arm located between the spring arms of a nipper, and adapted, when the lever is turned in one direction, to open the jaws, and when turned in the opposite direction to close said jaws, the opening and closing occurring at the beginning of the nipper travel, in order to adapt the jaws to grasp a length or lengths of the material, and also occurring at the end of the nipper travel, in order to permit the jaws to release the length or lengths of the material.

9. In a machine for making grass twine, the combination of a feedway or holder for the material, a series of devices, each provided with a nipper, each nipper consisting of depending spring arms converged from a desired point above their lower ends to said lower ends, in order to form gripping jaws, means acting on the nipper devices for causing alternate back and forth movements thereof, a lever pivoted to each nipper device, the end of one arm thereof carrying an arm located between the spring arms of a nipper, and trip bars over which the other arm of each lever is adapted to ride, as the lever is reciprocated with a nipper device, said bars adapted when the arm of the lever rides thereon to close the jaws, and to permit the opening of the jaws when said arm of the lever passes thereoff, the opening and closing occurring at the beginning of the nipper travel, in order to adapt the jaws to grasp a length or lengths of the material, and also occurring at the end of the nipper travel in order to permit the jaws to release the length or lengths of the material.

10. In a machine for making twine, the combination of means for forming lengths of material into twine, a tension-carrying device, a spool-carrying device, and means for bringing said tension-carrying device and the spool-carrying device closer to or farther away from the twine forming mechanism, in order to regulate the closeness of the wrapping of the twine around the lengths of material.

11. In a machine for making twine, the combination of mechanism for forming the lengths of material into twine, a rotatable winding drum adapted to have the completed product wound thereon, a reversely screw-threaded worm or screw, a guide on said screw, adapted to have the end of the completed twine passed therethrough, and provided with a projecting lug, said lug having a slotted projection at its end, a dog carried by the guide and provided with a head portion adapted to engage the threads of the screw, and with a projecting stem passing through the slot of the end projection of the lug, a pin intersecting the slot, and adapted when removed to permit of the removal of the dog, and a guide rod on which an extension from the guide is adapted to freely travel.

In testimony whereof, we affix our signatures, in presence of two witnesses.

LOUIS J. MONAHAN.
CONRAD KIEREN.

Witnesses:
H. I. WEED,
FRANK H. FARQUHAR.